(12) United States Patent
Hou et al.

(10) Patent No.: US 10,277,381 B2
(45) Date of Patent: Apr. 30, 2019

(54) RECEIVER PATH DISTORTION MITIGATION USING ADAPTIVE FILTER FEEDBACK

(71) Applicant: Huawei Technologies Co., Ltd., Shenzhen (CN)

(72) Inventors: Weikun Hou, Ottawa (CA); Ahikam Aharony, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 113 days.

(21) Appl. No.: 14/991,930

(22) Filed: Jan. 9, 2016

(65) Prior Publication Data

US 2017/0201368 A1    Jul. 13, 2017

(51) Int. Cl.
*H04B 1/48*     (2006.01)
*H04L 5/14*     (2006.01)
*H04L 5/00*     (2006.01)

(52) U.S. Cl.
CPC ............. *H04L 5/1461* (2013.01); *H04B 1/48* (2013.01); *H04L 5/0048* (2013.01); *H04B 2001/485* (2013.01)

(58) Field of Classification Search
CPC ...... H04B 1/00285; H04B 1/10; H04B 1/525; Y02B 60/50; H04W 52/0209
See application file for complete search history.

(56) References Cited

U.S. PATENT DOCUMENTS

| 6,754,340 B1* | 6/2004 | Ding ................. H03H 21/0012 370/465 |
| 2008/0039045 A1 | 2/2008 | Filipovic et al. |
| 2010/0093298 A1 | 4/2010 | Pratt et al. |
| 2010/0309774 A1* | 12/2010 | Astrom ................. H04B 1/525 370/201 |
| 2011/0275341 A1 | 11/2011 | Landmark et al. |
| 2012/0077452 A1 | 3/2012 | Dufrêne et al. |
| 2012/0140685 A1 | 6/2012 | Lederer et al. |
| 2013/0155911 A1 | 6/2013 | Kahrizi et al. |

(Continued)

FOREIGN PATENT DOCUMENTS

WO    2004036776 A1    4/2004

OTHER PUBLICATIONS

Hueber, Gernot, et al., "Smart Front-End Signal Processing for Advanced Wireless Receivers," IEEE Journal of Selected Topics Signal Processing, vol. 3, No. 3, pp. 472-487, 2009.

(Continued)

*Primary Examiner* — Mansour Oveissi (57) ABSTRACT

A duplex communication system includes a duplexer for transmitting and receiving signals, a transmitter part connected to the duplexer, and a receiver part connected to the duplexer, the receiver part comprising an amplifier for amplifying a received signal to provide an amplified received signal and a demodulator for downconverting the amplified received signal, and a second-order intermodulation distortion (IMD2) compensation module for compensating for second-order intermodulation distortion. The system also includes an adaptive filtering module that obtains a transmitter reference signal, generates filter coefficients for the IMD2compensation module and also adjusts a direct current (DC) bias of the demodulator based on the reference signal.

20 Claims, 11 Drawing Sheets

(56) References Cited

U.S. PATENT DOCUMENTS

2014/0334349 A1    11/2014  Mao et al.
2015/0358047 A1*   12/2015  Sarrigeorgidis ......... H04B 1/12
                                                          455/78

OTHER PUBLICATIONS

Razavi, Behzad, "Design Considerations for Direct-Conversion Receivers," IEEE Transactions on Circuits Systems—II: Analog and Digital Signal Processing, vol. 44, No. 6, pp. 428-435, 1997.
Dufrêne, Krzysztof, et al., "Digital Adaptive IIP2 Calibration Scheme for CMOS Downconversion Mixers," IEEE Journal of Solid-State Circuits, vol. 43, No. 11, pp. 2434-2445, 2008.
Jiang, Peichen, et al., "All-Digital Adaptive Module for Automatic Background IIP2 Calibration in CMOS Downconverters with Fast Convergence," IEEE Transactions on Circuits and Systems—II: Express Briefs, vol. 60, No. 7, pp. 427-431, 2011.
Valkama, M., et al., "Advanced Digital Signal Processing Techniques for Compensation of Nonlinear Distortion in Wideband Multicarrier Radio Receivers," IEEE Transactions on Microwave Theory and Techniques, vol. 54, No. 6, pp. 2356-2366, 2006.
Namgoong, Won, et al., "Direct-Conversion RF Receiver Design," IEEE Transactions on Communications, vol. 49, No. 3, pp. 518-529, 2001.
Elahi, Imtinan, et al., "IIP2 and DC Offsets in the Presence of Leakage at LO Frequency," IEEE Transactions on circuits Systems—II: Express Briefs, vol. 53, No. 8, pp. 647-651, 2006.
International Search Report for PCT/CN2016/110199 dated Mar. 15, 2017.

* cited by examiner

RECEIVER PATH DISTORTION MITIGATION USING ADAPTIVE FILTER FEEDBACK

TECHNICAL FIELD

The present disclosure generally relates to radio frequency (RF) communication systems and, more particularly, to mitigation of signal distortion in a receiver path of a RF communication system.

BACKGROUND

A frequency division duplex (FDD) microwave communication system has a transceiver that can simultaneously transmit and receive data for two-way communication. Examples of telecommunication standards that are based on FDD are Universal Mobile Telecommunications System Frequency Division Duplex (UMTS-FDD), Frequency Division Duplex Long Term Evolution (FDD-LTE), Code Division Multiple Access (CDMA), Wideband CDMA (WCDMA), and Asymmetric Digital Subscriber Line (ADSL).

Figure 1:
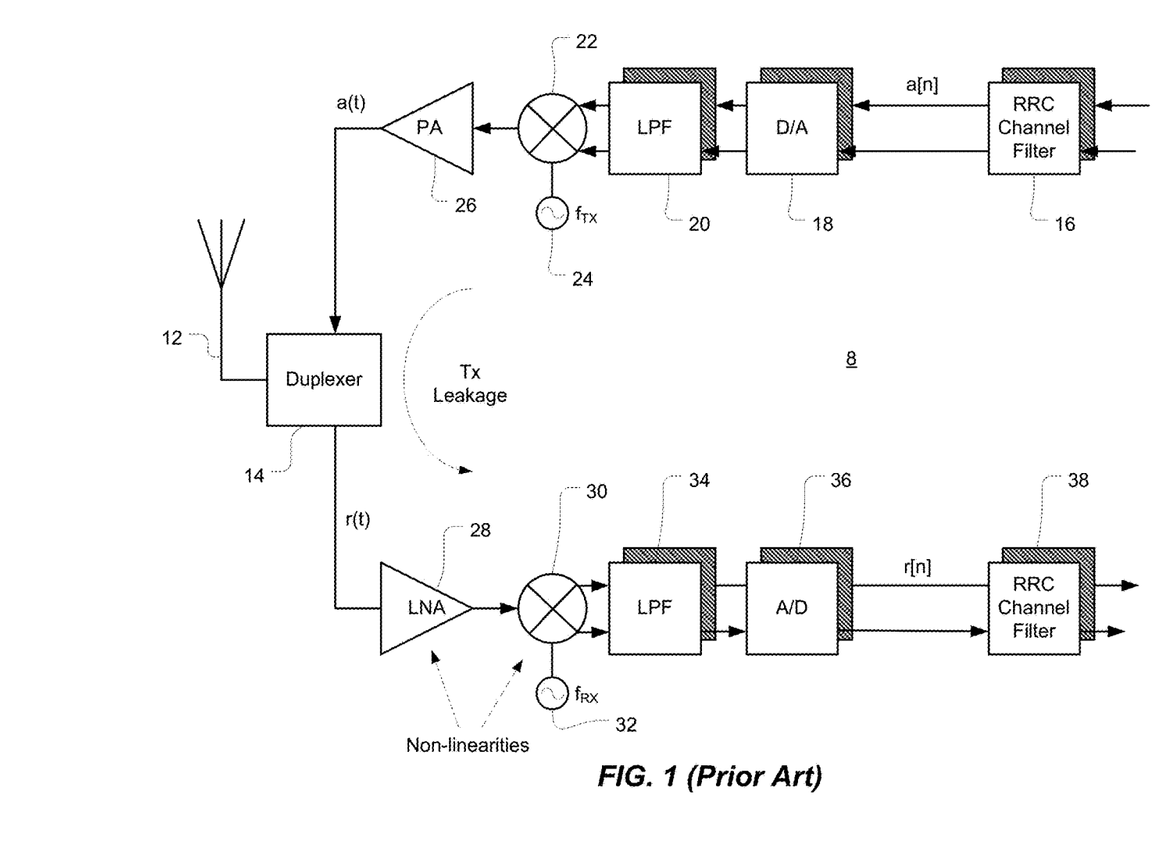
FIG. 1 depicts a prior-art FDD microwave system that is susceptible to second-order intermodulation distortion (IMD2) arising from transmitter leakage through the duplexer and due to nonlinearities in the receiver's low-noise amplifier and mixer.

A conventional FDD system generally designated by reference numeral 8 is depicted in FIG. 1. The system 8 has a common antenna 12 and a shared duplexer 14. The transmitter part includes a channel filter 16, digital-to-analog converter 18, low-pass filter 20, transmitter mixer 22, local oscillator 24, and power amplifier 26. The receiver part includes a low-noise amplifier 28, receiver mixer 30, local oscillator 32, low-pass filter 34, analog-to-digital converter 36 and channel filter 38.

On the transmit path, the transmitter part of the transceiver modulates data onto a radio frequency (RF) carrier signal to generate a modulated signal and then amplifies the modulated signal in the power amplifier 26 to obtain a transmit signal of sufficient strength. The transmit signal is routed through the duplexer 14 and transmitted via the antenna 12. On the receive path, the receiver part of the transceiver obtains a received signal via the common antenna 12 and the shared duplexer 14 and then amplifies, filters, and demodulates the received signal to obtain baseband signals. The baseband signals are further processed to recover data from the signal.

In addition to the desired signal, the received signal may include a portion of the transmit signal that leaks from the transmitter via the duplexer to the receiver. Since the transmit signal and the desired signal are typically at two different frequencies, the transmit leakage signal can normally be filtered out by the duplexer 14 and does not pose a problem in itself. However, second order intermodulation (IM2) and higher order intermodulation (IM4, IM6, etc.), collectively known as even order intermodulation, of the leaked transmitter signal may arise due to the nonlinear characteristics of the mixer 30 and low-noise amplifier (LNA) 28 of the receiver. Part of this intermodulation distortion (IMD) may fall within the bandwidth of the desired baseband signal thereby creating noise that may degrade performance. This is particularly important where the communication system seeks to support higher-order modulation, e.g. 8 k-QAM, in which the IM should be, for example, about 40-50 dB lower than the signal.

There is therefore a need in the art for a technique to mitigate, reduce or minimize the deleterious effects of even-order intermodulation distortion in a receiver.

SUMMARY

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later The present specification discloses a system and method to reduce, minimize, attenuate or otherwise compensate for even-order intermodulation distortion that arises from transmitter signal leakage through the duplexer of a duplex communication system such as a frequency division duplex microwave transceiver. An adaptive filtering module acts in concert with an intermodulation distortion (IMD) compensation module to cancel IMD based on a reference signal obtained from the local transmit signal of the transmitter part. In addition, the adaptive filtering module may adjust a DC bias of the mixer (demodulator).

One inventive aspect of the disclosure is a duplex communication system including a duplexer for transmitting a transmit signal and receiving a receive signal, a transmitter part connected to the duplexer, for providing the transmit signal, and a receiver part connected to the duplexer, the receiver part comprising an amplifier for receiving and amplifying the receive signal to provide an amplified receive signal, a demodulator for downconverting the amplified receive signal to provide a downconverted receive signal, and an even-order intermodulation distortion (IMD) compensation module for computing a correction for reducing even-order intermodulation distortion of the downconverted receive signal and an adaptive filtering module coupled to the transmitter part for obtaining a transmitter reference signal, obtaining an IMB signal $y_{IMD}$ based on the obtained transmitter reference signal, and providing the IMD signal $y_{IMD}$ to the IMD compensation module for computing the correction wherein the adaptive filtering module is further configured to adjust.

Another inventive aspect of the disclosure is a method of minimizing or reducing even-order intermodulation distortion (IMD) in a duplex communication system having a duplexer for transmitting and receiving signals. The method entails receiving a signal using the antenna and duplexer, amplifying a received signal to provide an amplified received signal, downconverting the amplified received signal using a demodulator, and compensating for even-order intermodulation distortion (IMD) using a compensation module that coordinates with an adaptive filtering module. The adaptive filtering module performs acts of obtaining a transmitter reference signal, generating filter coefficients for the IMB compensation module based on the reference signal and adjusting a direct current (DC) bias of the demodulator based on the reference signal.

Another inventive aspect of the disclosure is a frequency division duplex microwave transceiver comprising a duplexer for transmitting and receiving signals, a transmitter part connected to the duplexer, and a receiver part connected to the duplexer. The receiver part may include an amplifier for amplifying a received signal to provide an amplified received signal, a QAM demodulator for downconverting the amplified received signal directly to baseband, and a second-order intermodulation distortion (IMD2) compensation module for compensating for second-order intermodulation distortion (IMD2). The transceiver may further include an adaptive filtering module that obtains a transmitter reference signal, generates filter coefficients for the IMD2 compensation module and also adjusts a direct current (DC) bias of the demodulator based on the reference signal.

BRIEF DESCRIPTION OF THE DRAWINGS

These and other features of the disclosure will become more apparent from the description in which reference is made to the following appended drawings.

DETAILED DESCRIPTION OF EMBODIMENTS

The following disclosure contains, for the purposes of explanation, numerous specific embodiments, implementations, examples and details in order to provide a thorough understanding of the disclosure. It is apparent, however, that the embodiments may be practiced without these specific details or with an equivalent arrangement. In other instances, some well-known structures and devices are shown in block diagram form in order to avoid unnecessarily obscuring the embodiments of the disclosure. The description should in no way be limited to the illustrative implementations, drawings, and techniques illustrated below, including the exemplary designs and implementations illustrated and described herein, but may be modified within the scope of the appended claims along with their full scope of equivalents.

Figure 2:
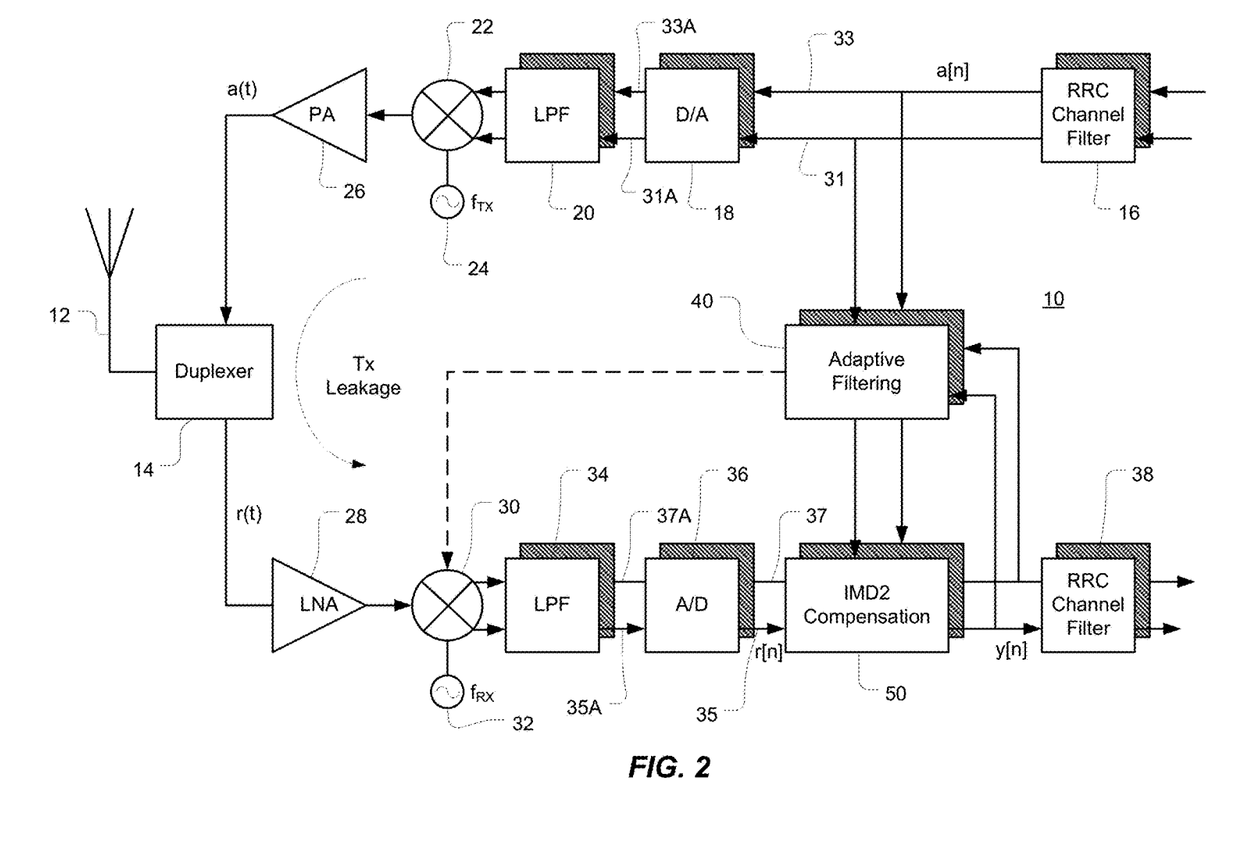
FIG. 2 depicts an FDD microwave system for reducing second-order intermodulation distortion (IMD2) in accordance with an embodiment of the present disclosure.

In the embodiment shown by way of example in FIG. 2, an FDD microwave communication system (or transceiver) 10 includes a transmitter part and a receiver part. The transmitter and receiver parts are also referred to herein as the transmitter and receiver chains. The transmitter and receiver parts share the antenna 12 and the duplexer 14. In the transmitter part, the digital root-raised cosine (RRC) channel filter 16 is connected to the digital-to-analog converter (DAC) 18 for converting stream of digital data to be transmitted into an analog signal. The analog signal is filtered by the low-pass filter (LPF) 20. The transmitter mixer 22 (modulator) receives a carrier frequency from the transmit local oscillator (LO) 24 to upconvert the filtered analog signal which is then amplified by the power amplifier (PA) 26.

In the receiver part the low-noise amplifier (LNA) 28 amplifies an analog signal received from the shared antenna 12 and duplexer 14. The receiver mixer 30 (demodulator) and local oscillator 32 downconvert the analog signal to baseband. The low-pass filter (LPF) 34 filters the downconverted signal. The analog-to-digital converter (ADC) 36 converts the analog signal to a digital stream of data. The channel filter 38, e.g. a RRC filter, then filters the digital data stream numerically.

The communication system depicted by way of example in FIG. 2 modulates and demodulates the signals based on a quadrature amplitude modulation (QAM) scheme. As such, on the transmit path, a transmit (TX) data processor, not shown, processes data to be transmitted and outputs a digital in-phase (I) signal 31 and a digital quadrature (Q) signal 33. The DAC 18 converts the I 31 and Q 33 signals to analog which provides analog I 31A and Q 33A signals to the transmitter mixer 22. The transmitter mixer 22 modulates a signal from the transmit LO 24 with the analog I 31A and Q 33A signals to provide a modulated signal. The transmit LO signal is at a frequency of $f_{TX}$, which is determined by the transmission frequency for the selected channel. The power amplifier 26 then amplifies the modulated signal and provides a transmit signal a(t), which is routed through the duplexer 14 and transmitted via the antenna 12.

On the receive path, the antenna 12 receives a signal r(t). The duplexer 14 routes the received signal r(t) from the antenna to the LNA 28. A portion of the transmit signal a(t) also leaks via the duplexer 14 to the LNA 28. The signal at the input of the LNA 28 thus includes the received signal r(t) from the antenna 12, as well as a transmit leakage signal from the power amplifier 26. The LNA 28 amplifies its input signal and provides an amplified signal. The receiver mixer 30 demodulates the amplified signal with a receive LO signal from the receiver LO 32, thus providing baseband I 35A and Q 37A signals. The receive LO signal is at a frequency of $f_{RX}$, which is determined by a receiver frequency for the selected channel. The analog low-pass filter (LPF) 34 filters the baseband I 35A and Q 37A analog signals to remove unwanted frequency components of the mixed signal, and provides filtered analog I 35A and Q 37A signals at the output. The LPF 34 may also perform anti-alias filtering for the subsequent digitization process. The analog-to-digital converter (ADC) 36 digitizes the filtered analog I 35A and Q 37A signals and outputs digital I 35 and Q 37 signals. A digital filter, e.g. the RRC channel filter 38, filters the received I 35 and Q 37 signals and outputs digitally filtered I and Q signals. The RRC channel filter 38 may attenuate noise and other unwanted components generated by the digitization process. A receive (RX) data processor, not shown, processes the filtered I and Q signals to provide decoded data.

In the embodiment illustrated in FIG. 2, the system 10 includes an adaptive filtering module 40 and an IMD2 compensation module 50. The adaptive filtering module 40 cooperates with the IMD2 compensation module 50 to reduce or minimize (i.e. mitigate or compensate for) the unwanted second-order intermodulation distortion (IMD2) caused by transmitter signal leakage through the duplexer. The compensated signal is denoted in FIG. 2 as y[n]. Although in the embodiment of FIG. 2, the compensation module 50 is designed to minimize IMD2 which the most dominant component, it will be appreciated that in other embodiments the compensation module 50 may be designed to compensate for higher intermodulation for the even-order harmonics, i.e. IM4, IM6, IM8, etc. The system 10 presented in FIG. 2 both adjusts the DC bias voltage of the demodulator (mixer) 30 and performs IMD2 cancellation on a received signal r[n] using a reference signal generated from a local transmit signal a[n]. The DC removal and IMD2 cancellation may be performed simultaneously. In another embodiment, it may be performed sequentially. The two modules 40, 50 operate in the digital baseband. These modules may be software, hardware, firmware or any suitable combination thereof. Cancellation can be performed without disrupting the transmission or reception of signals. As explained below, cancellation may be performed by digitally subtracting a computed IM2 value that has been determined from a transmit reference signal taken from the digital portion of the transmit path, e.g. between the RRC channel filter 16 and the digital-to-analog converter 18.

For the purposes of this specification, the expression "reducing" in the context of reducing IM2 (or IMD2) shall be understood as meaning minimizing, attenuating, diminishing, mitigating or compensating for IM2 (or IMD2).

In the illustrated embodiments, the receiver chain is implemented as a homodyne receiver with a direct-to-baseband architecture. In the direct-to-baseband architecture, also referred to as a zero intermediate frequency (ZIF) transceiver, the received signal is frequency downconverted from RF directly to baseband in one stage, as shown in FIG. 2. The transmitter chain may also be implemented with a heterodyne or super-heterodyne architecture or with a direct-from-baseband (ZIF) architecture (as shown in FIG. 2). For clarity, the following description is for the direct-to-baseband (ZIF) architecture for the receiver chain.

The system depicted in FIG. 2 may be used for a wireless device, a base station, or for other electronic devices having FDD data transmission and reception capabilities. A wireless device may be a mobile station (MS) or user equipment (UE), i.e. any user handheld terminal, cellular phone, smart phone, personal digital assistant (PDA), or any other device equipped with a wireless modem, etc.

FIG. 2 shows a simplified transceiver design. In other embodiments the signals in the transmit and receive paths (i.e. transmitter and receiver chains) may be conditioned by one or more stages of amplifier, filter, mixer, etc. The circuit blocks may also be arranged differently from the configuration shown in FIG. 2. Furthermore, other circuit blocks not shown in FIG. 2 may also be used to condition the signals in the transmit and receive paths. For example, filters and/or amplifiers may be added before and/or after each mixer 22, 30.

Figure 3:
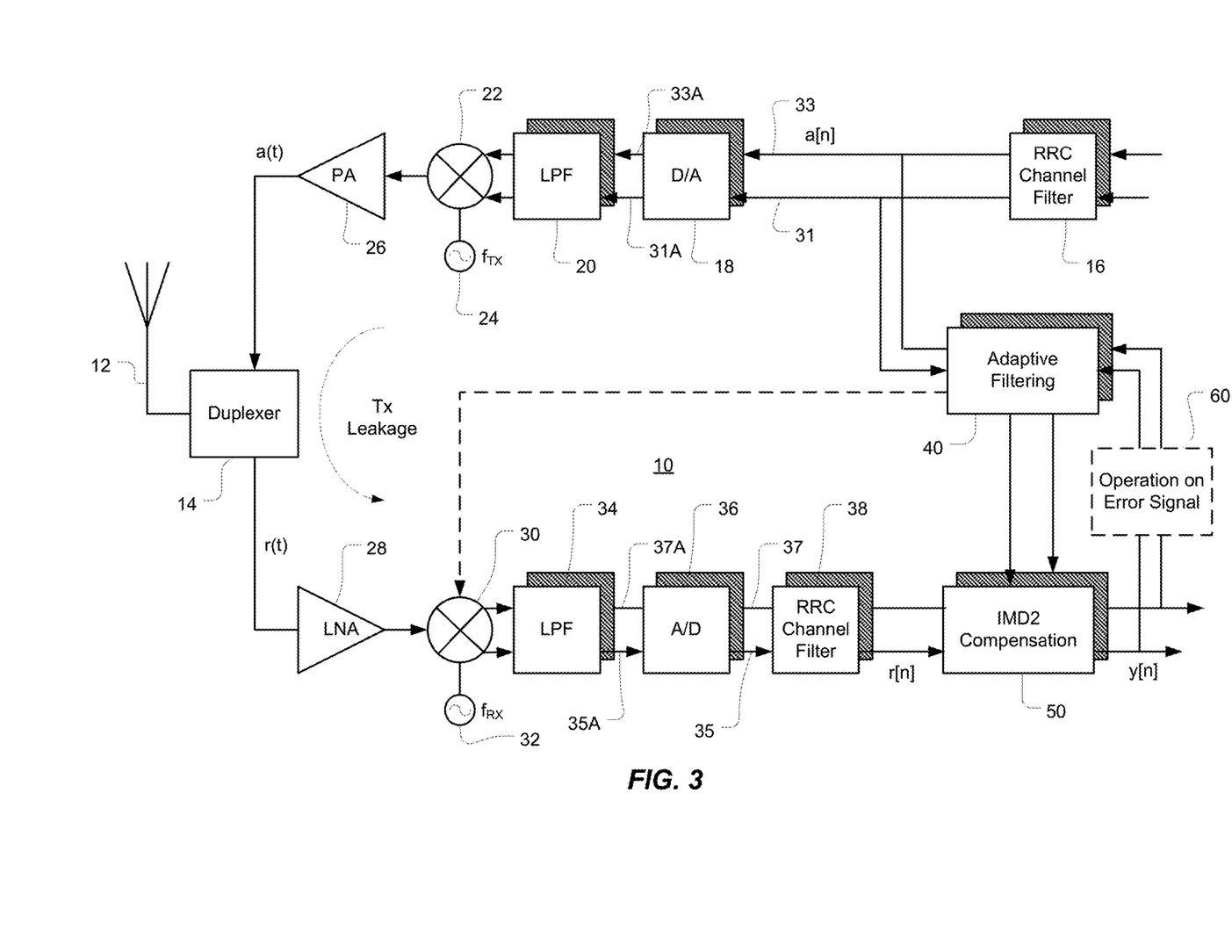
FIG. 3 depicts an FDD microwave system for reducing second-order intermodulation distortion (IMD2) in accordance with another embodiment of the present disclosure.

FIG. 3 depicts an alternate embodiment of the system 10 in which the IMD2 compensation module 50 is placed after the receiver RRC channel filter 38 or equalizer, i.e. downstream of the RRC channel filter 38 or equalizer. As further shown by way of example in FIG. 3, the system 10 may include an optional error signal processing module 60 which performs various operations on the compensated signal y[n] to provide feedback to the adaptive filtering module 40. For example, the error signal processing module 60 may implement decision-directed algorithms or radius-directed equalization methods to update the adaptive filtering module 40.

Figure 4:
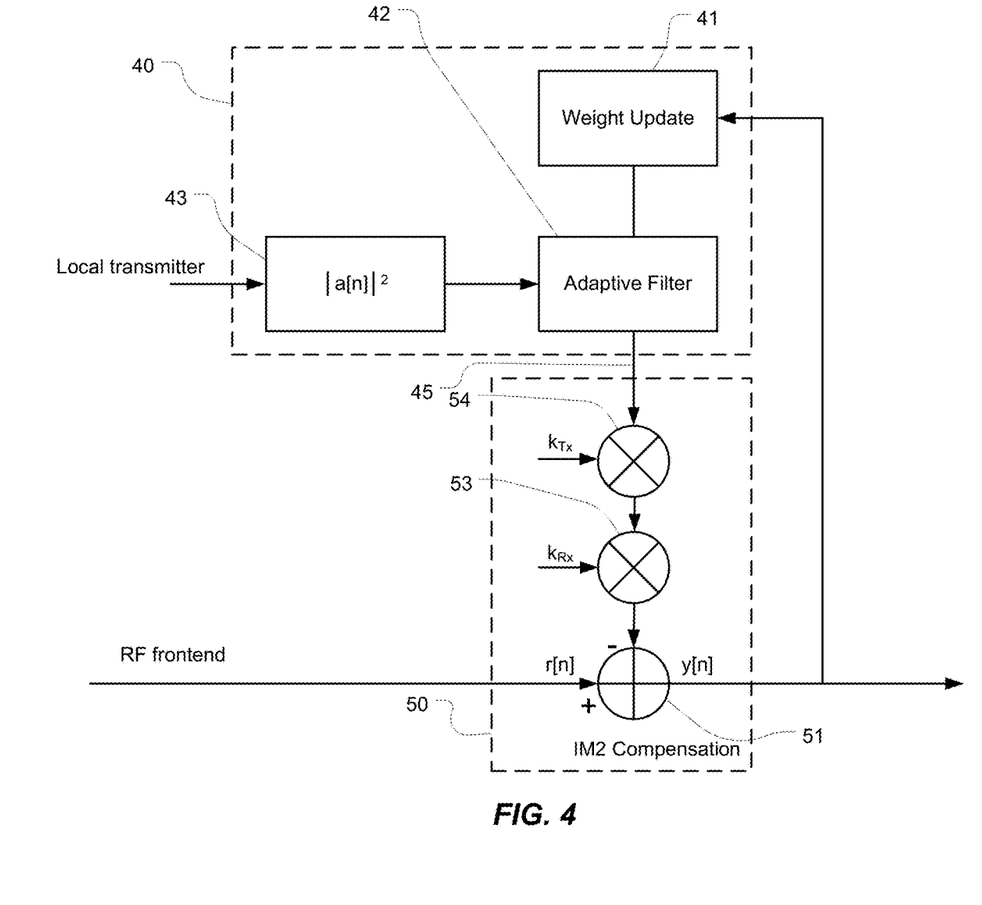
FIG. 4 depicts an adaptive filter in accordance with one embodiment.

FIG. 4 illustrates an adaptive filtering technique for IMD2 compensation in accordance with one embodiment of the present disclosure. As shown by way of example in FIG. 4, the adaptive filtering module 40 includes an adaptive filter 42 which receives both a weight update 41 and a power value 43 equal to the square of the amplitude (absolute value) of the instantaneous power of the local transmit signal a[n]. This IM2 reference signal is taken (tapped) from the transmitter chain.

As shown in FIG. 4, the adaptive filter 42 supplies a computed IM2 value 45 to the IM2 compensation module 50. The IM2 compensation module 50 includes a subtraction module 51, a transmitter gain multiplication module 53, and a receiver gain multiplication module 54 for computing y[n].

In the illustrated embodiment, the adaptive filtering module 40 obtains an IMD signal $y_{IMD}$ based on the obtained transmitter reference signal and provides the IMD signal $y_{IMD}$ to the IMB compensation module 50 for computing the correction. The adaptive filtering module 40 adjusts a direct current (DC) bias of the demodulator 30 based on the transmitter reference signal. The adaptive filtering module 40 comprises an adaptive filter for computing the $y_{IMD}$ signal as:

$$y_{IMD} = w_n^H a_n$$

In the illustrated embodiment, the IM2 compensation is performed according to the following equation in which bolded characters represent vectors:

$$y[n] = r[n] - k_{Tx} k_{Rx} y_{IMD}$$

or, equivalently, as:

$$y[n] = r[n] - k_{Tx} k_{Rx} w_n^H a_n$$

where $w_n$ represents a weight coefficient vector including the adaptive filter coefficients ("filter coefficients")

r[n] represents the received signal from the receiver frontend y[n] represents the compensated signal after IM2 compensation $k_{Tx}$ represents the gain related to the Tx RF chain (transmitter part)

$k_{Rx}$ represents the gain related to Rx RF chain (receiver part)

$w_n^H$ represents the conjugate transpose (Hermitian) of the weight coefficient vector $w_n$.

The $a_n$ vector is calculated as:

$$a_n = [|a[n]|^2, |a[n-1]|^2, \ldots, |a[n-M+1]|^2]^T$$

In the foregoing, $a_n$ is a vector that represents the last M transmitted samples.

The filter coefficients may be updated using a least mean squares (LMS) technique as follows:

$$w_{n+1} = w_n + \mu a_n y^*[n]$$

In the above equation, $\mu$ represents an adaptation rate. It is noted that $\mu \ll 1$ for stability and $\mu \geq 0$ for negative (desired) feedback.

The filter coefficients can alternatively be updated by using a recursive least squares (RLS) optimization technique as follows:

$$c_n = R_{n-1}^{-1} a_n, \quad g_n = \frac{c_n}{\lambda + a_n^H c_n}$$

$$R_n^{-1} = \frac{1}{\lambda} \left[ R_{n-1}^{-1} - g_n c_n^H \right]$$

$$w_n = w_{n-1} + y*[n] g_n$$

wherein:
$c_n = R_{n-1}^{-1} a_n$ is an auxiliary vector for recursive calculation of the filter coefficients;

$$g_n = \frac{c_n}{\lambda + a_n^H c_n}$$

is a gain vector for updating the filter coefficients at an n-th time instant;

$R_n$ is an autocorrelation matrix of an input signal; and $$R_n^{-1} = \frac{1}{\lambda}\left[R_{n-1}^{-1} - g_n c_n^H\right]$$

is an inverse of the autocorrelation matrix $R_n$.

Figure 5:
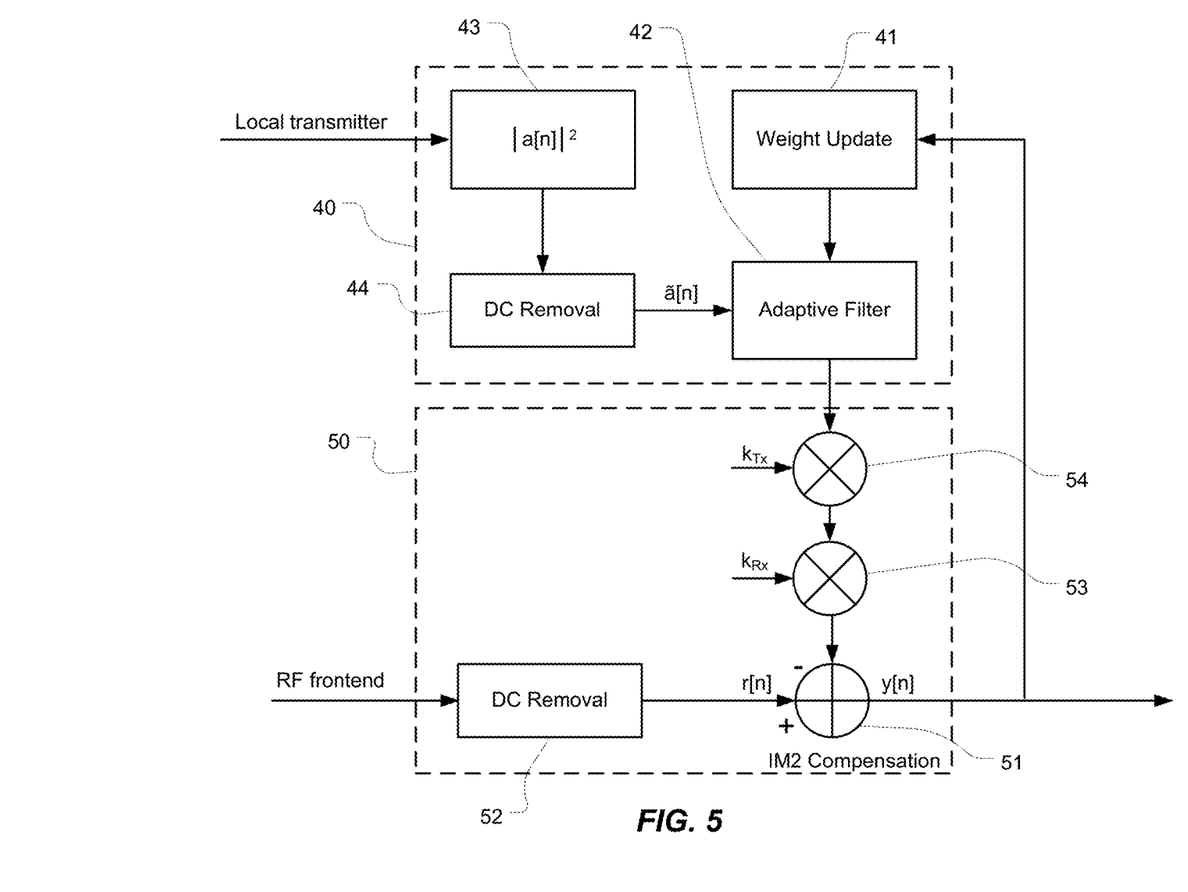
FIG. 5 depicts an adaptive filter in accordance with another embodiment.

FIG. 5 illustrates an adaptive filtering technique involving DC offset removal. The DC component exists in the IM2 reference signal, degrading LMS performance. An unknown DC offset, which is caused by LO leakage (or other factors in the received signal), biases the adaptive filter taps. In at least one embodiment, the system and method disclosed herein provides a solution to this problem by performing DC removal on both the IM2 reference signal and the input signal before adaptive filtering. The DC bias is a voltage bias applied to the demodulator (mixer) 30.

In at least one embodiment of this method, the DC offset of the signal is corrected digitally by estimating this offset and by subtracting it digitally from the signal. It is to be noted that the bias voltage is not computed directly, but rather the voltage is changed and effect of this change is measured by observing the energy in the filter taps of the adaptive filtering module 40. The bias voltage (DC bias) is changed until a local minimum energy is observed.

The DC offset removal or lessening may be performed using a first-order infinite impulse response (IIR) filter. The DC estimate and DC removal are defined, respectively, using the following two equations, in which k represents a DC adaptation rate (wherein 0<k<<1 for the circuit to work), s[n] represents the DC estimate, a[n] represents the transmit signal and ã[n] represents the DC removal:

DC Estimate: $s[n] = k|a[n]|^2 + (1-k)s[n-1]$

DC Removal: $\tilde{a}[n] = |a[n]|^2 - s[n]$

FIG. 5 depicts an embodiment in which the adaptive filtering module 40 performs DC lessening or complete removal using a DC removal module 44. The IM2 compensation module 50 also performs DC removal using a DC removal module 52. These modules may be implemented in software, hardware, firmware or any suitable combination thereof.

Figure 6:
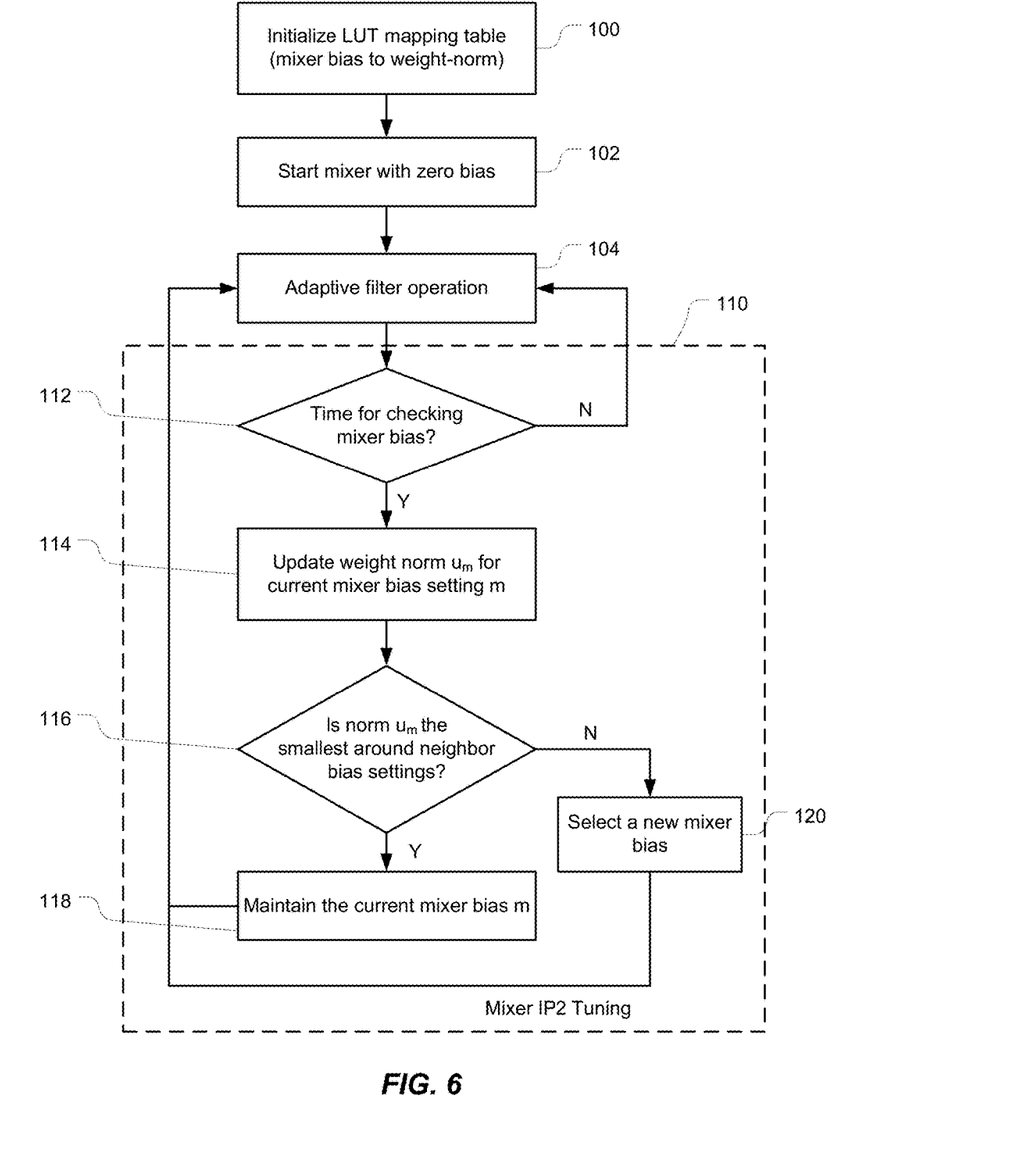
FIG. 6 is a flowchart depicting a method of tuning mixer bias using adaptive filter feedback.

FIG. 6 is a flowchart depicting a method of adjusting mixer bias using adaptive filter feedback. This method uses adaptive filter coefficients to adjust the mixer bias based on the criterion that the optimized mixer bias corresponds to the smallest filter norm. This tuning can be triggered when the adaptive filter is working stably, i.e. when the filter weight coefficients have already converged, e.g. when a mean square error (MSE) output metric is stable. At step, act or operation 100 the method is commenced by initializing the mapping table or look up-table (LUT) containing values relating the mixer bias to the weight-norm. At step 102, the mixer is started with zero bias. The adaptive filter performs filtering at step 104 in conjunction with mixer IP2 tuning 110. The IP2 tuning 110 entails a decision block 112 involving a decision as to whether it is time to check the mixer bias. If no, then the method cycles back to step 104. If yes, then the weight norm $u_m$ is updated 114 for the current mixer bias setting m. Subsequently, at decision block 116, it is determined whether the norm urn is the smallest around neighbor bias settings. If it is, the current mixer bias is maintained 118. If not, a new optimized mixer bias is selected 120. Operations then cycle back to step 104 to perform further adaptive filtering.

Figure 7:
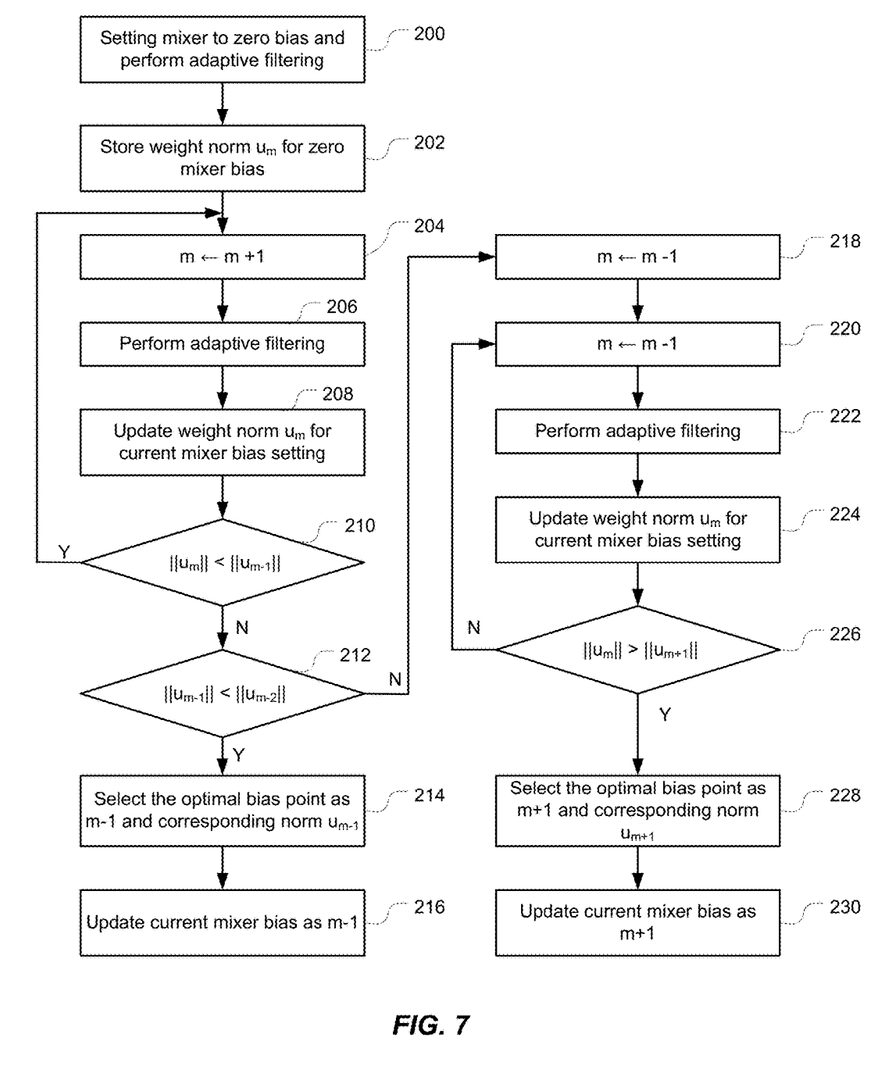
FIG. 7 is a flowchart depicting a method of optimizing the mixer bias.

FIG. 7 is a flowchart depicting a method of optimizing the mixer bias. This method commences with a step, act or operation 200 of setting the receiver mixer 30 (FIGS. 2 and 3) to zero bias and performing adaptive filtering. At step 202, a weight norm urn is stored for zero mixer bias, where m is a weight index. The weight index m is initially set to unity. At step 204, m is set to the value of m+1. At step 206, adaptive filtering is performed. At step 208, the weight norm urn is updated for the current mixer bias setting. At step 210, a decision is made as to whether $\|u_m\| < \|u_{m-1}\|$. If yes, then operations cycle back to step 204. If not, operations proceed to decision 212 in which another decision 214 evaluates whether $\|u_{m-1}\| < \|u_{m-2}\|$. If yes, the optimal bias point is selected at step 214 as m−1 and the corresponding norm $u_{m-1}$. The current mixer bias is then updated at step 216 as m−1. If decision 212 yields a negative answer, then m is set to the value of m−1 at step 218. At step 220, m is again decremented. At step 222, adaptive filtering is performed. At step 224, the weight norm urn is updated for the current mixer bias setting. At decision 226, the method evaluates whether $\mu u_m\| > \|u_{m+1}\|$. If not, m is decremented by returning to step 220. If yes, the optimal bias point is selected 228 to be m+1 and the corresponding norm $u_{m+1}$. The current mixer bias is then updated 230 as m+1.

Figure 8:
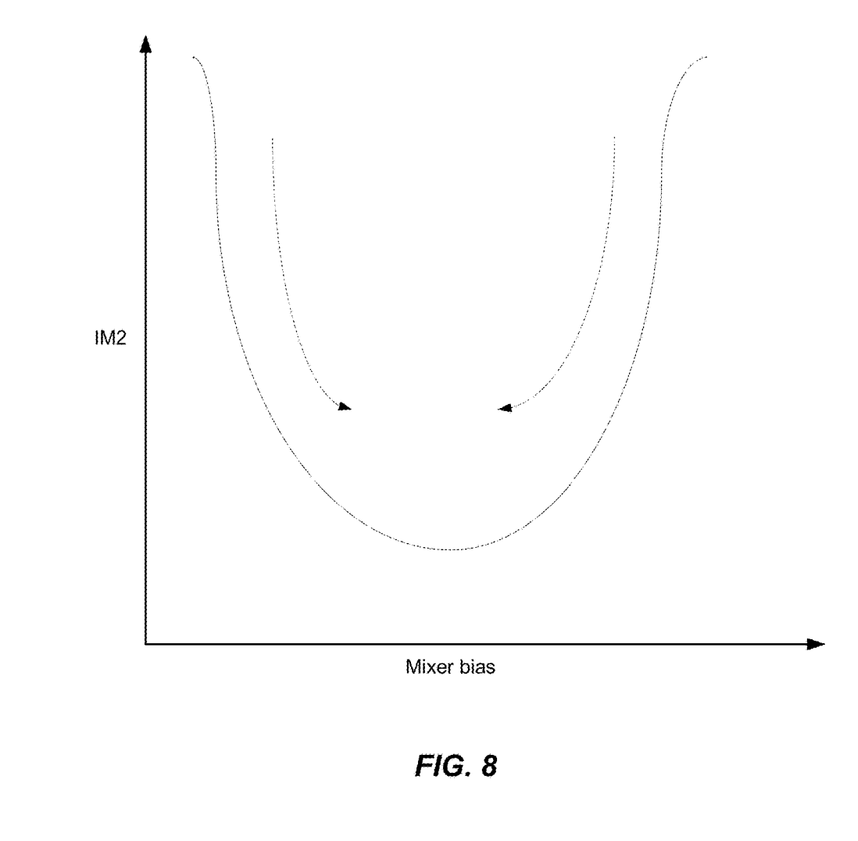
FIG. 8 is a graph showing a parabolic relationship between second-order intermodulation (IM2) and mixer bias.

FIG. 8 is a graph showing the parabolic relationship between second-order intermodulation (IM2) and mixer bias. The central valley of the parabolic curve represents the targeted area of optimal bias in which IM2 is minimal. The method seeks to find the optimal mixer bias by iteratively searching the neighborhood with the smallest weight norm.

Figure 9:
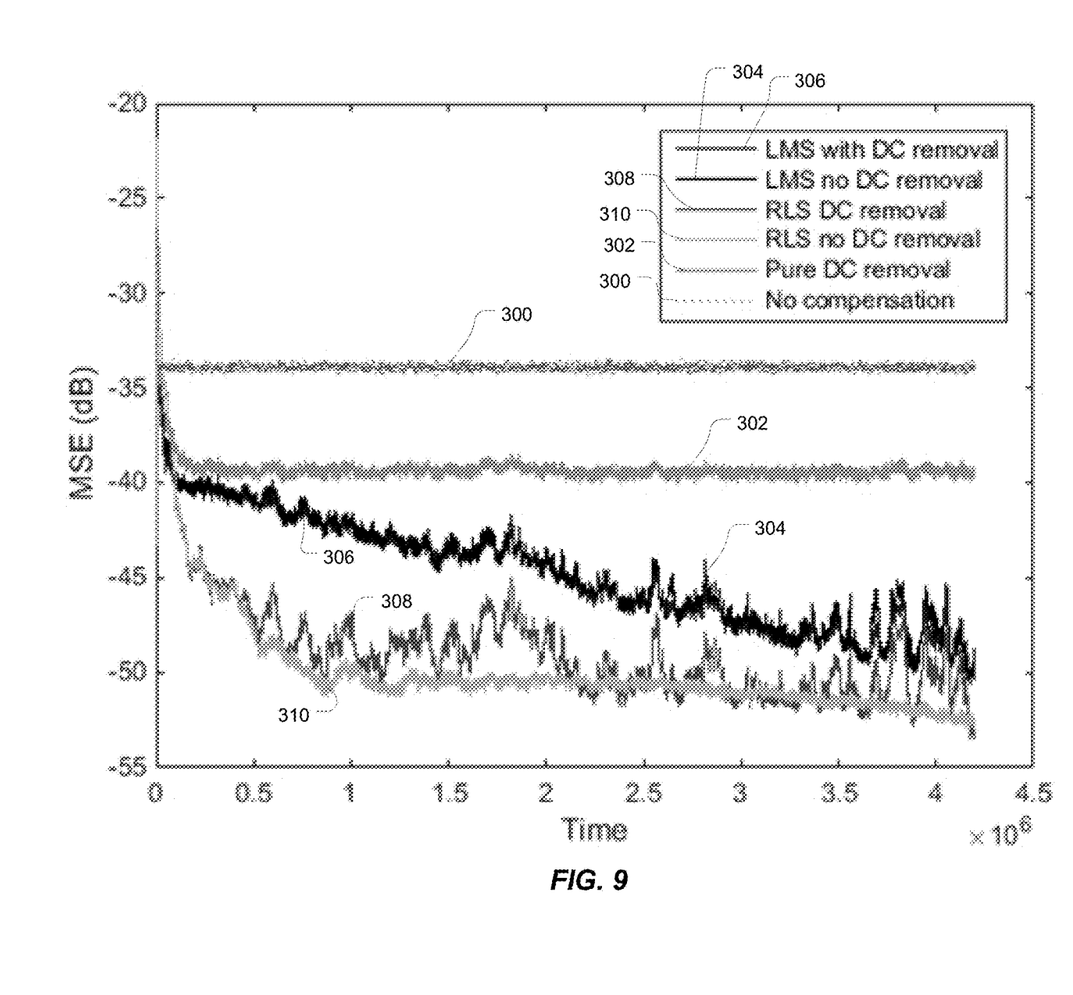
FIG. 9 is a graph showing the mean square error (MSE) of QAM demodulation with no unknown DC offset is present.
Figure 10:
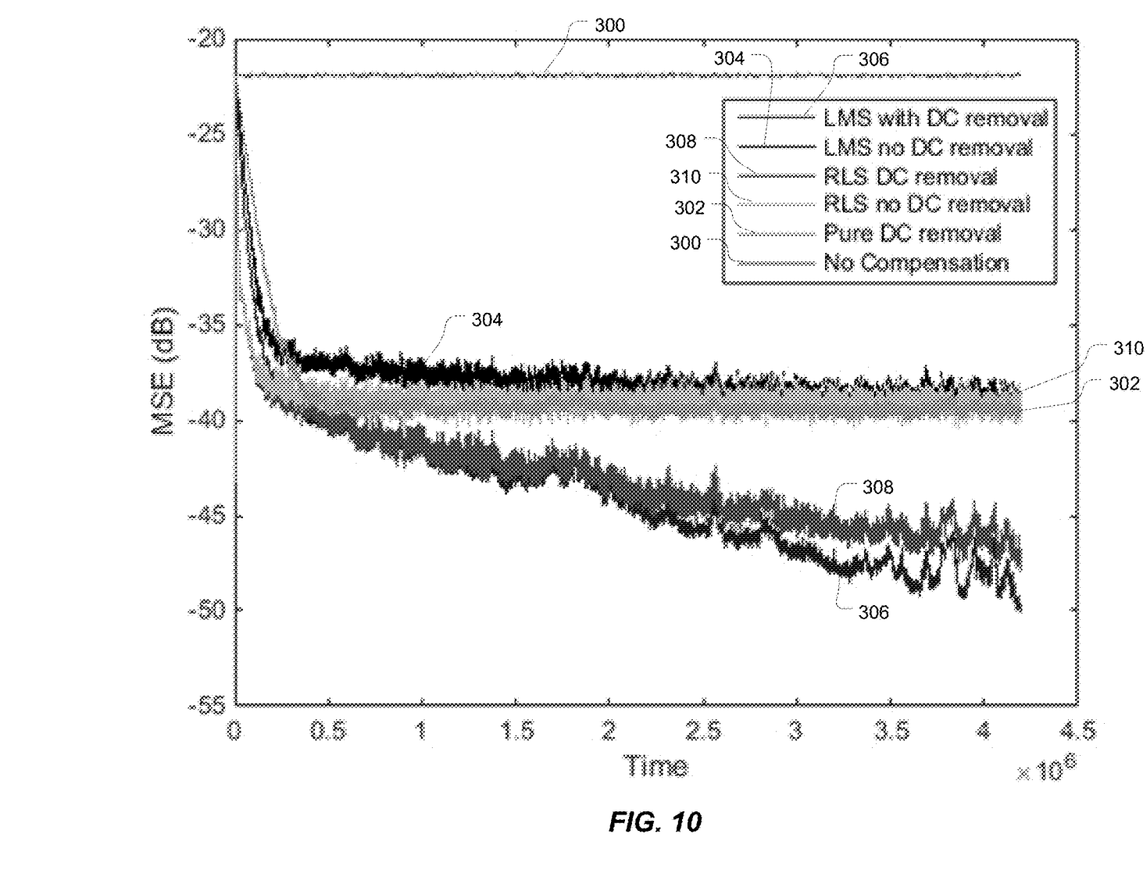
FIG. 10 is a graph showing the MSE of QAM demodulation when an unknown DC offset is present.
Figure 11:
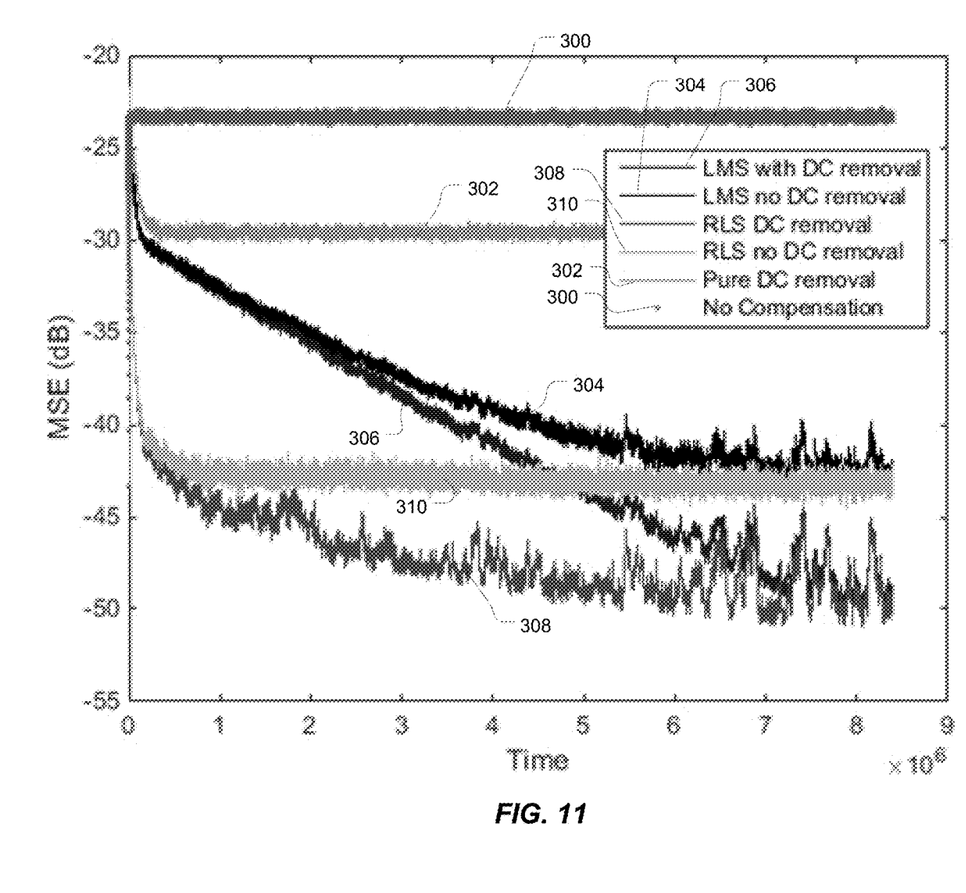
FIG. 11 is a graph showing the MSE of QAM demodulation when a small unknown DC offset is present (0.017+ j0.02 V).

FIGS. 9-11 are graphs showing the performance of the method. In all three figures, plot 300 represents no compensation, 302 represents pure DC removal, 304 represents LMS optimization with no DC removal, 306 represents LMS optimization with DC removal, 308 represents RLS optimization with DC removal and 310 represents RLS optimization with no DC removal.

FIG. 9 is a graph showing the mean square error (MSE) of QAM demodulation in which no unknown DC offset is present. The system was configured as follows: 64 QAM, sample delay=10.62, μ for LMS=2^(−16), λ for RLS=1. IMD2 level due to transmitter leakage is 33 dB lower than the received signal level. FIG. 9 shows that, when no additional DC offset is present, RLS performs the best. All the methods reduce MSE significantly. RLS optimization with DC removal does not help in this case, because RLS optimization itself can remove the DC of IM2. The average performance of LMS optimization with and without DC removal are similar. LMS filtering can improve MSE performance by 8 dB compared to pure DC removal operation.

FIG. 10 is a graph showing the MSE of QAM demodulation when an unknown DC offset is present. The system was configured similarly to that of FIG. 9 except for μ for LMS=2^(−20) and there was a DC offset of 0.027−j0.035 V. The unknown DC offset is caused by LO leakage and/or A/D bias. IMD2 level due to transmitter leakage is 33 dB lower than the received signal level. FIG. 10 shows that LMS and RLS optimization with DC removal can improve MSE performance by 7-8 dB. Conventional RLS and LMS optimization techniques may not be as effective. Their performances degrade because the DC offset generates a biased error signal in the adaptive filter.

FIG. 11 is a graph showing the MSE of QAM demodulation when a small unknown DC offset is present (0.017+ j0.02 V). All system parameters are identical to the FIG. 10 except for the DC offset. The IMD2 level due to transmitter leakage is 23 dB lower than the received signal level. FIG. 11 demonstrates the efficacy of both the LMS and RLS techniques with DC removal. It is noteworthy that pure DC removal is less effective due to the stronger IM2 at this setting, i.e. the IM2 level is stronger (−23 dB) and the unknown DC offset is smaller. In this case, it is apparent that much better performance is obtained by performing DC removal before adaptive filtering.

The system and method disclosed herein is able to remove transmitter-induced second-order intermodulation (IM2) distortion using adaptive filtering techniques and by providing feedback for tuning the mixer in the RF frontend. Unlike conventional methods requiring dedicated RF circuits, the system and method disclosed herein operates fully in digital baseband, simplifies the RF design and reduces overall product cost. The accuracy of adaptive IM2 compensation provided by this system and method can support high-order modulation schemes (e.g. 4 K-8 KQAM) in microwave transmissions. For example, the adaptive IM2 compensation disclosed herein enables very high-order QAM modulation schemes (4 K-QAM and 8 K-QAM) using a SiGe Radio Frequency Integrated Circuit (RFIC) or equivalent. Another advantage is that no additional system resources such as pilot overhead or training time is required. Therefore, it is non-disruptive to data reception while operating.

The system and method disclosed herein may be used to compensate for distortion arising not only from IM2 but also its harmonics, IM4, IM6, IM8, etc. Together, IM2, IM4, IM6, IM8, etc. are referred to herein as even-order intermodulation.

The IMD reduction or minimization techniques, systems and methods described herein may be implemented in hardware, firmware, software, or a combination thereof. For a hardware implementation, the processing units used for IMD detection and reduction (or minimization) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, and so on) that perform the functions described herein. The firmware and/or software code may be stored in a memory and executed by a processor.

A device or apparatus implementing the techniques described herein may be a standalone unit or incorporated within another device. The device may be a standalone integrated circuit (IC), a group of ICs that may include memory ICs for storing data and/or instructions, an ASIC such as a mobile station modem (MSM), a module that may be embedded within other devices, a cellular phone, wireless device, handset, or mobile unit, or base station transceiver, etc.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including", "entailing" and "containing", or verb tense variants thereof, are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g. "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the inventive concept(s) disclosed herein.

The invention claimed is:

1. A duplex communication system comprising:
   a duplexer for transmitting a transmit signal and receiving a receive signal;
   a transmitter part connected to the duplexer, for providing the transmit signal;
   a receiver part connected to the duplexer, the receiver part comprising:
     an amplifier for receiving and amplifying the receive signal to provide an amplified receive signal;
     a demodulator for downconverting the amplified receive signal to provide a downconverted receive signal; and
     an even-order intermodulation distortion (IMD) compensation module for computing a digital correction for reducing even-order intermodulation distortion of the downconverted receive signal;
   an adaptive filtering module coupled to the transmitter part for obtaining a transmitter reference signal, obtaining an IMD signal $y_{IMD}$ based on the obtained transmitter reference signal, and providing the IMD signal $y_{IMD}$ to the IMD compensation module for computing the correction: and
   a feedback loop from the adaptive filter to the demodulator;
   wherein the adaptive filtering module is further configured to adjust a direct current (DC) bias of the demodulator based on the transmitter reference signal via the feedback loop.

2. The system of claim 1, wherein the adaptive filtering module comprises an adaptive filter for computing the $y_{IMD}$ signal as:

$$y_{IMD} = w_n^H a_n$$

wherein $a_n$ is a vector comprised of squared last M transmitted samples a[n], a[n−1]. . . , a[n−M] of the transmit signal, defined as:

$$a_n=[|a[n]|^2,|a[n-1]|^2,\ldots,|a[n-M+1]|^2]^T$$

and $w_n$ represents a weight coefficient vector including filter coefficients of the adaptive filtering module;

wherein the IMD compensation module performs second-order intermodulation (IMD2) compensation according to the equation:

$$y[n]=r[n]-k_{Tx}k_{Rx}y_{IMD}$$

wherein: r[n] represents a received signal from a frontend of the receiver part;

y[n] represents a compensated signal after IM2 compensation;

$k_{Tx}$ represents a gain related to the transmitter part;

$k_{Rx}$ represents a gain related to the receiver part; and $w_n^H$ represents a conjugate transpose of the weight coefficient vector $w_n$.

3. The system of claim 2 wherein the filter coefficients are updated using a least mean squares (LMS) technique according to:

$$w_{n+1}=w_n+\mu a_n y^*[n]$$

wherein μ represents an adaptation rate.

4. The system of claim 3 wherein the filter coefficients are updated by using a recursive least squares (RLS) according to:

$$c_n = R_{n-1}^{-1}a_n, \quad g_n = \frac{c_n}{\lambda + a_n^H c_n}$$

$$R_n^{-1} = \frac{1}{\lambda}\left[R_{n-1}^{-1} - g_n c_n^H\right]$$

$$w_n = w_{n-1} + y*[n]g_n$$

wherein:

$c_n = R_{n-1}^{-1}a_n$ is an auxiliary vector for recursive calculation of the filter coefficients;

$$g_n = \frac{c_n}{\lambda + a_n^H c_n}$$

is a gain vector for updating the filter coefficients at an n-th time instant;

$R_n$ is an autocorrelation matrix of an input signal; and $$R_n^{-1} = \frac{1}{\lambda}\left[R_{n-1}^{-1} - g_n c_n^H\right]$$

is an inverse of the autocorrelation matrix $R_n$.

5. The system of claim 1 wherein the adaptive filtering module is configured for adjusting the DC bias by computing a DC estimate and a DC removal according to, in which k represents a DC adaptation rate, s[n] represents the DC estimate, a[n] represents the transmit signal and ã[n] represents the DC removal:

DC Estimate : $s[n]=k|a[n]|^2+(1-k)s[n-1]$

DC Removal : $ã[n]=|a[n]|^2-s[n]$

6. The system of claim 1 further comprising an error signal processing unit to perform operations on an error signal to provide error signal feedback to the adaptive filtering module.

7. The system of claim 1 wherein the transmitter part comprises a QAM modulator and wherein the demodulator in the receiver part is a QAM demodulator.

8. The system of claim 1, further comprising an antenna coupled to the duplexer, wherein the antenna and duplexer are configured as part of a frequency division duplex (FDD) microwave transceiver.

9. The system of claim 1 wherein the demodulator downconverts the received signal to baseband, whereby the system functions as a zero intermediate frequency transceiver.

10. The system of claim 5 wherein the DC removal is performed on both the reference signal and r[n].

11. The system of claim 1 wherein the receiver part comprises a local oscillator coupled to the demodulator for downconverting the amplified received signal, a low pass filter downstream of the demodulator, an analog-to-digital converter for digitizing a filter signal and a channel filter.

12. The system of claim 11 wherein the transmitter part comprises a channel filter, a digital-to-analog converter to convert a digital signal to an analog signal, a low pass filter for filtering the analog signal, a modulator coupled to a local oscillator for upconverting the signal and a power amplifier for amplifying the signal for delivery to the duplexer and antenna.

13. A method of reducing even-order intermodulation distortion (IMD) in a duplex communication system having a duplexer for transmitting and receiving signals, the method comprising:

receiving a signal using the duplexer;

amplifying the received signal to provide an amplified received signal;

downconverting the amplified received signal using a demodulator;

digitally compensating for even-order intermodulation distortion (IMD) using a compensation module that coordinates with an adaptive filtering module, wherein the adaptive filtering module performs acts of:

obtaining a transmitter reference signal;

generating filter coefficients for the IMD compensation module based on the reference signal;

adjusting a direct current (DC) bias of the demodulator based on the reference signal via a feedback loop from the adaptive filter to the demodulator.

14. The method of claim 13 wherein the adaptive filtering module performs second-order intermodulation distortion (IMD2) compensation according to the equation:

$$y[n]=r[n]-k_{Tx}k_{Rx}w_n^H a_n$$

where $a_n$ is a vector that represents the last M transmitted samples such that:

$$a_n=[|a[n]|^2,\ldots,|a[n-M+1]|^2]^T$$

and where:

$w_n$ represents a weight coefficient vector including the filter coefficients for the adaptive filter;

r[n] represents a received signal from a receiver frontend;

y[n] represents a compensated signal after IM2 compensation;

$k_{Tx}$ represents a gain related to the transmitter part;

$k_{Rx}$ represents a gain related to the receiver part;

$w_n^H$ represents a conjugate transpose of the weight coefficient vector $w_n$.

15. The method of claim 14 wherein the filter coefficients are updated using a least mean squares (LMS) technique according to:

$$w_{n+1}=w_n+\mu a_n y^*[n]$$

wherein $\mu$ represents an adaptation rate.

16. The method of claim 14 wherein the filter coefficients are updated by using a recursive least squares (RLS) according to:

$$c_n = R_{n-1}^{-1} a_n, \; g_n = \frac{c_n}{\lambda + a_n^H c_n}$$
$$R_n^{-1} = \frac{1}{\lambda}\left[R_{n-1}^{-1} - g_n c_n^H\right]$$
$$w_n = w_{n-1} + y*[n]g_n$$

wherein:

$c_n = R_{n-1}^{-1} a_n$ is an auxiliary vector for recursive calculation of the filter coefficients;

$$g_n = \frac{c_n}{\lambda + a_n^H c_n}$$

is a gain vector for updating the filter coefficients at an n-th time instant;

$R_n$ is an autocorrelation matrix of an input signal; and $$R_n^{-1} = \frac{1}{\lambda}\left[R_{n-1}^{-1} - g_n c_n^H\right]$$

is an inverse of the autocorrelation matrix $R_n$.

17. The method of claim 13 wherein the adaptive filtering module adjusts the DC bias by computing a DC estimate and a DC removal according to, in which k represents a DC adaptation rate, s[n] represents the DC estimate, a[n] represents the transmit signal and ã[n] represents the DC removal:

DC Estimate : $s[n]=k|a[n]|^2+(1-k)s[n-1]$

DC Removal : $ã[n]=|a[n]|^2-s[n]$

18. The method of claim 13 comprising adjusting the DC bias by monitoring the energy of the filter taps of the adaptive filter module until a local minimum energy is found.

19. A frequency division duplex microwave transceiver comprising:
a duplexer for transmitting and receiving signals;
a transmitter part connected to the duplexer; and
a receiver part connected to the duplexer, the receiver part comprising an amplifier for amplifying a received signal to provide an amplified received signal and a QAM demodulator for downconverting the amplified received signal directly to baseband, and a second-order intermodulation distortion (IMD2) compensation module for digitally compensating for second-order intermodulation distortion (IMD2); and
an adaptive filtering module that obtains a transmitter reference signal, generates filter coefficients for the IMD2 compensation module and also adjusts a direct current (DC) bias of the demodulator based on the reference signal via a feedback loop from the adaptive filter to the demodulator.

20. The transceiver of claim 19 wherein the adaptive filtering module performs the IMD2 compensation according to the equation:

$$y[n]=r[n]-k_{Tx}k_{Rx}w_n^H a_n$$

where $a_n$ is a vector that represents the last M transmitted samples such that:

$$a_n=[|a[n]|^2,|a[n-1]|^2,\ldots,|a[n-M+1|^2]^T$$

$w_n$ represents is a weight coefficient vector including the filter coefficients for the adaptive filter;
r[n] represents a received signal from a receiver frontend;
y[n] represents a compensated signal after IM2 compensation;
$k_{Tx}$ represents a gain related to the transmitter part;
$k_{Rx}$ represents a gain related to the receiver part;
$w_n^H$ represents a conjugate transpose of the weight coefficient vector $w_n$.

* * * * *

UNITED STATES PATENT AND TRADEMARK OFFICE
CERTIFICATE OF CORRECTION

Page 1 of 1

PATENT NO. : 10,277,381 B2
APPLICATION NO. : 14/991930
DATED : April 30, 2019
INVENTOR(S) : Weikun Hou and Ahikam Aharony It is certified that error appears in the above-identified patent and that said Letters Patent is hereby corrected as shown below:

In the Claims

Claim 14, Column 12, Line 57:

" $a_n = [|a[n]|^2, \ldots, |a[n-M+1]|^2]^T$ "

Should read:

$$\mathbf{a}_n = \left[|a[n]|^2, |a[n-1]|^2, \cdots, |a[n-M+1]|^2\right]^T$$

Signed and Sealed this
Tenth Day of December, 2019

Andrei Iancu
*Director of the United States Patent and Trademark Office*